Aug. 14, 1945.  P. R. LEA  2,382,072
AUTOMATIC PROPELLER PITCH CONTROL DEVICE
Filed Dec. 22, 1941  2 Sheets-Sheet 1
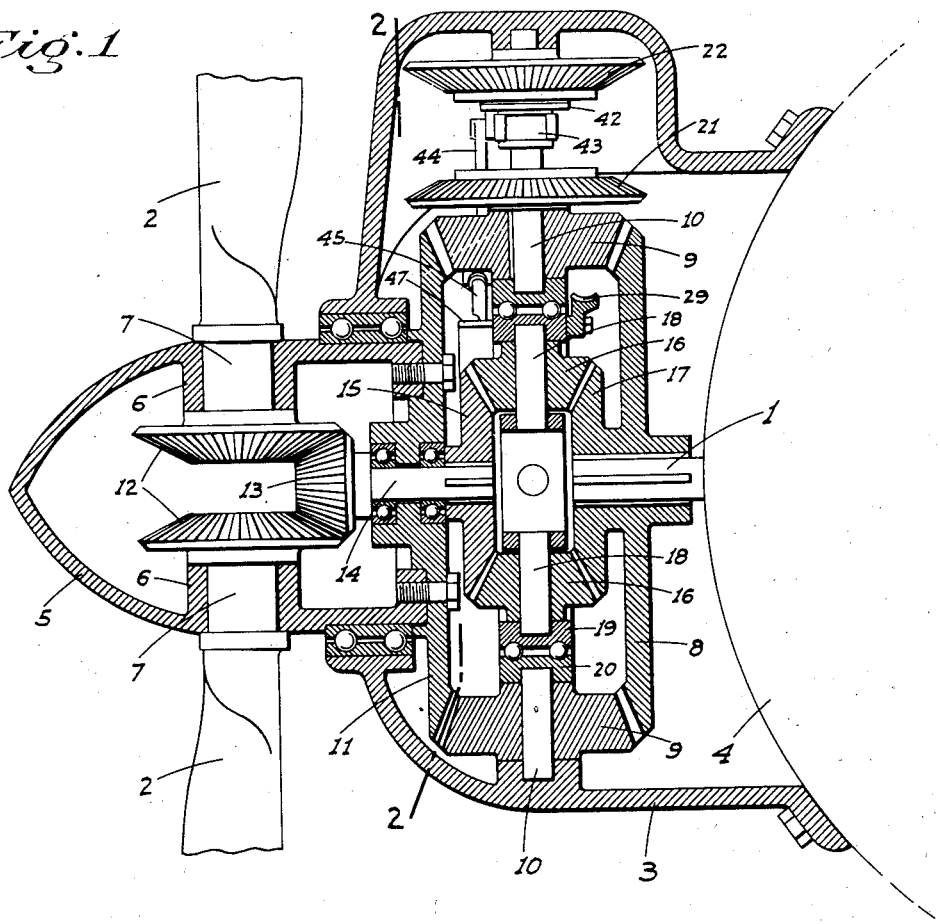
INVENTOR
Percy R. Lea
BY
ATTYS Aug. 14, 1945.   P. R. LEA   2,382,072
AUTOMATIC PROPELLER PITCH CONTROL DEVICE
Filed Dec. 22, 1941   2 Sheets-Sheet 2
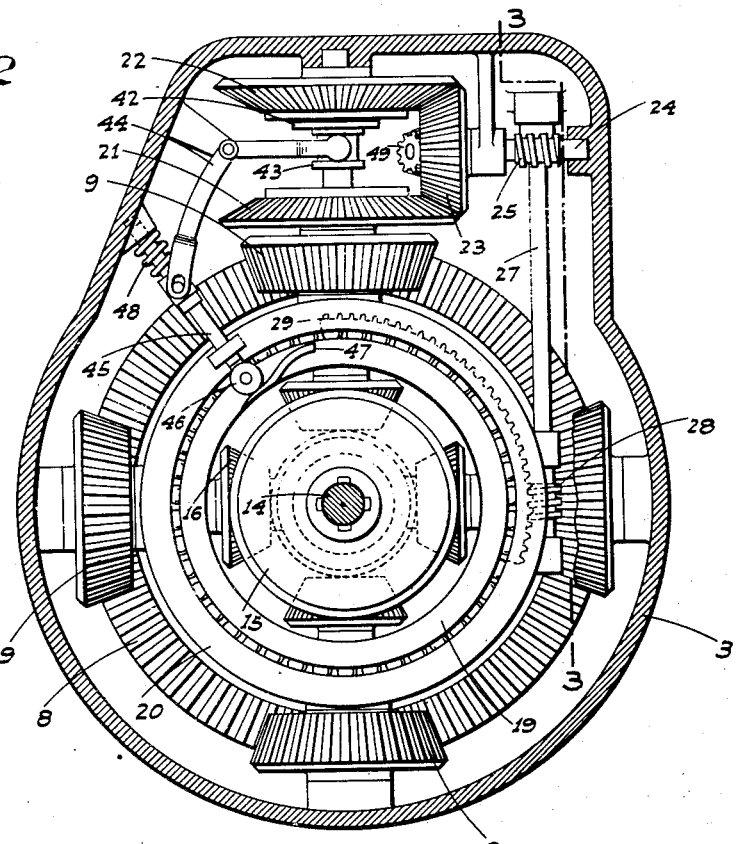
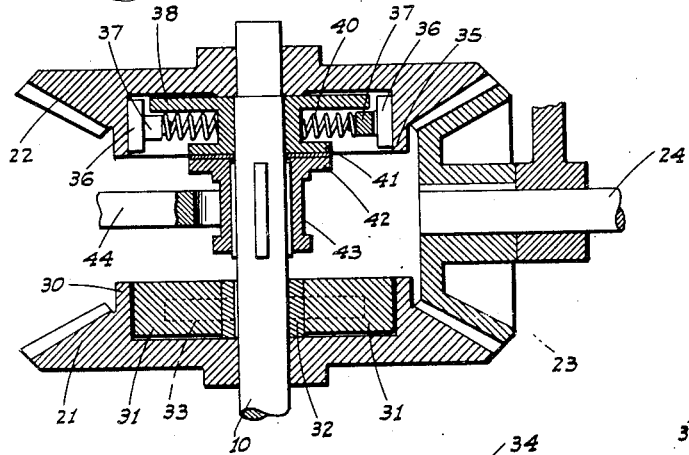
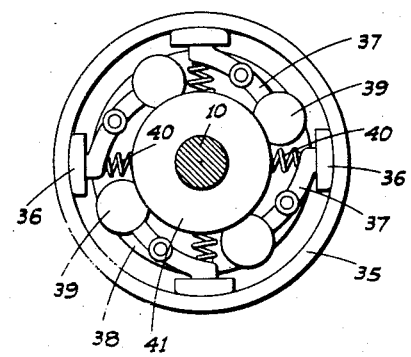
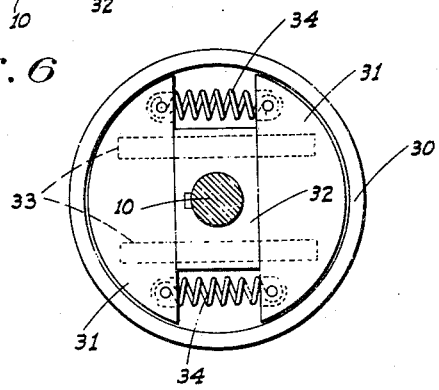
INVENTOR
Percy R. Lea
BY
ATTYS Patented Aug. 14, 1945

2,382,072

UNITED STATES PATENT OFFICE 2,382,072

AUTOMATIC PROPELLER PITCH CONTROL DEVICE

Percy Ray Lea, Stockton, Calif.

Application December 22, 1941, Serial No. 423,935

6 Claims. (Cl. 170—135.6)

This invention relates to a pitch control mechanism for an airplane propeller, my principal object being to provide a mechanism for the purpose which uses the direct driving power of the engine to effect changes in propeller pitch, or in other words harnesses the engine power to the control mechanism to operate the latter. In this manner, a self-contained unit is provided, which operates automatically and entirely independent of any outside influence or connection, such as electric, hydraulic, or other source of power, for its operation.

Particularly, I contemplate using the increased power generated by the engine when excessive acceleration starts, to drive the blades to higher pitch against engine thrust, thus imposing greater load on the engine and preventing its over-speed while increasing the speed of the airplane through greater propeller efficiency for that particular attitude of the airplane.

I have also however provided similar engine-connected means to use engine power to reduce the propeller pitch when a reduction in engine speed occurs, so as to cause such speed to return to normal. In connection with this latter feature, a further object of the invention is to provide means for automatically placing said pitch reducing means out of operation when the pitch drops below a predetermined low limit, as for instance when the throttle is closed. This will give a fixed blade setting at the desired low pitch, for subsequent use of the engine.

With the use of my automatically functioning propeller pitch control mechanism, the pitch is maintained substantially constant without any attention on the part of the pilot. At the same time, however, I have provided means whereby the pilot himself can manually alter the pitch at any time.

By reason of the features above generally recited, the airplane engine, propeller drive, and pitch control mechanism forms a single self-contained, self-sufficient and self-regulating homogenous unit in its functioning as a drive force for the airplane. It will also be evident that the unit may be made very compact, with fast and mutual cooperation between the different parts, and that each function is performed as a natural or logical sequence, without the need of any superimposed or additional force to operate the pitch control mechanism, as is now done.

These objects I accomplish by means of such structure and relative arrangement of parts as will fully appear by a perusal of the following specification and claims.

In the drawings similar characters of reference indicate corresponding parts in the several views:

Figure 1 is a sectional elevation of my improved pitch control mechanism.

Figure 2 is a transverse section on the line 2—2 of Fig. 1.

Figure 3 is a fragmentary sectional elevation on the line 3—3 of Fig. 2.

Figure 4 is an enlarged sectional elevation of the automatic multiple clutch unit.

Figure 5 is a plan view of one clutch of the unit.

Figure 6 is a plan view of the opposed clutch of the unit.

Referring now more particularly to the drawings, the characters of reference on the drawings, the connecting mechanism between the drive or engine shaft 1 and the propeller blades 2 is essentially the same as shown in my U. S. Patent No. 2,316,438, dated April 13, 1943, and comprises the following structure:

A housing 3 projects from and is secured on the engine housing 4 in surrounding relation to the projecting portion of the shaft 1, and turnably supported in the outer end of the housing 3 is a hollow propeller hub 5 having radial bearings 6 for the base spindles 7 of the blades 2.

Fixed on the shaft 1 is a bevel gear 8 facing away from the housing 4 and meshing with bevel pinions 9 mounted on axial stems 10 disposed in a fixed position in the housing 3 in radial relation with the gear 8. The pinions mesh with another bevel gear 11, facing and the same size as gear 8 and of course axially alined therewith. The gear 11 is fixed to the hollow hub member 5, and it will therefore be seen that as the shaft 1 rotates the hub will rotate also.

Fixed on the inner end of the spindles 7 are bevel gears 12 meshing with a bevel pinion 13 disposed therebetween and axially alined with gears 8 and 11. The pinion 13 is mounted on a shaft 14 turnably supported in the hub of gear 11 and projecting therethrough. Beyond said gear, or between the gears 8 and 11, a bevel gear 15, smaller than the gear 11, is fixed on the adjacent end of shaft 14. This gear meshes with bevel pinions 16, which in turn mesh with a bevel gear 17 of the same size as gear 15 and fixed rigid or made integral with gear 8. The pinions 16 are mounted on axial spindles 18 disposed radially of the gears and supported in a ring 19 extending about the pinions, concentric with the shafts and gears. This ring is turnably supported by a surrounding ring 20 which is engaged and maintained in a fixed position by the spindles 10 of the pinions 9. The ring 20 is therefore held against rotation in the housing 3, and it will be seen that if the ring 19 is also held against rotation, the gear 15 will be driven at the same speed as gear 11, so that the shaft 14 and propeller hub 5 will be stationary relative to each other and the hub will rotate without any rotation of the blade spindles in the hub. If, however, the ring 19 is rotated in one direction or the other relative to the ring 20, the blade spindles will be rotated in the hub to increase or decrease the pitch of the blades, depending on the direction of rotation of said ring.

This rotation is automatically imparted to the ring upon an increase or decrease in the speed of the shaft 1 from a predetermined normal by the following means:

The spindle 10 of one of the pinions 9, preferably the topmost one, is fixed on its pinion and extends radially out some distance beyond the same. Turnable on the projecting portion of the spindle 10 in oppositely facing relation to each other are bevel gears 21 and 22, constantly engaging a bevel pinion 23 therebetween. This pinion 23 is fixed on a shaft 24 journaled in the housing 3 at right angles to the shaft 1 and having a worm 25 thereon. This worm meshes with a worm gear 26 (see Fig. 3), from which a shaft 27 depends substantially tangent to and adjacent one side of ring 19. A worm 28 on the lower end of this shaft engages a segmental worm gear 29 fixed on the ring 19, the shaft 27 being journaled both in connection with the housing 3 and with the fixed ring 20, as shown. If the gear 21 is rotated in one direction therefore the ring will be rotated in one direction, while if the gear 22 is rotated in the same direction the ring 19 will be rotated in the opposite direction.

Such rotation of the gear 21 is arranged to increase the blade pitch and the rotation of gear 22 is arranged to decrease the pitch by means functioning automatically upon increase or decrease respectively in the speed of spindle 10, which of course is proportionate to the speed of shaft 1. The gear 21 is cupped to provide an internal annular clutch element 30 and opposed clutch shoes 31 are disposed inside the element 30. The shoes 31 are supported for rotation with a block 32 fixed on the spindle 10 and also have opposed diametral movement relative to each other by means of rods 33 in the block on which the shoes slide. Springs 34 connect the shoes and yieldably prevent separating movement thereof under the influence of centrifugal force set up by rotation of the spindle 10, being set to hold the shoes from outward movement until the speed of the spindle 10 exceeds its predetermined normal. When such speed is exceeded, the increase in centrifugal force thus generated causes the shoes to move out and engage the clutch element 30 so that the gear 21 will rotate with the spindle 10 and the ring 19 will thus be rotated to cause an increase in propeller pitch.

The gear 22 is also cupped to form an annular clutch element 35 and disposed in the cup are circumferentially spaced clutch shoes 36. These shoes are mounted on arms 37 pivoted intermediate their ends on a disc 38 turnable on the spindle 10. Weights 39 on the arms tend to swing the same in a direction to withdraw the shoes from the clutch element 35 upon outward movement of the weights due to centrifugal force, and springs 40 act on the shoes in opposition to the weights. The weights and springs are so related to each other that with normal or excessive engine speed, the weights are thrown out so that the shoes are held clear, but when the speed and centrifugal force are decreased below normal, the springs will act to move the shoes into frictional engagement with the clutch element 35.

The disc 38 is provided with a clutch disc 41 normally engaged with a cooperating disc 42 formed on a sleeve 43 slidably splined on the spindle 10. A bellcrank 44 is pivoted in the housing 3 and is formed at one end as a shift fork engaging the sleeve 43 as shown in Fig. 2, and at its other end is connected to a rod 45 extending radially of the shaft 1 and mounted in the housing 3 for axial movement. At its inner end the rod carries a roller 46 adapted to engage a cam track 47 on the ring 19. A spring 48 acts on the bellcrank in a direction to hold the clutch discs 41 and 42 engaged and the cam track is arranged so as to slide the rod and shift the bellcrank in opposition to the spring pressure so as to release the clutch, upon rotation of the ring 19 in a pitch decreasing direction and to a point such that the pitch has been reduced to a predetermined low.

It will therefore be seen that as long as the pitch is above said minimum, the disc 38 and the clutch shoes mounted thereon will turn with the spindle 10 and the engagement of the shoes with the clutch element 35 will cause the gear 22 to rotate and reduce the pitch due to the gearing connections between the ring 19 and said gear. As soon as the clutch 41—42 becomes disengaged however, continued engagement of the shoes with the element 35 will not rotate the gear 22 since the disc 38 is then turning freely on the spindle 10.

It may here be noted that while only a small turning pressure is exerted on the gear 22 by the clutch connection, the power between said gear and the propeller blades is multiplied many times by the intermediate worm and other gearing, so that ample power for turning the blades in one direction or the other is provided at the blades themselves. Besides the automatic pitch control unit above described the pitch may be manually adjusted by means of a hand rotated pinion 49 meshing with the pinion 23.

It will of course be understood that all movable parts will have suitable bearings, the particular type and location of which form no part of this invention.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A propeller unit including a relatively fixed housing, a propeller hub turnably supported by the housing, propeller blades turnable in the hub to provide for pitch adjustment thereof, a drive shaft, driving connections between the shaft and hub to rotate the latter, a pitch control mechanism for the blades including a bevel pinion mounted in the housing radially out from the drive shaft and permanent drive connections between the pinion and blades, opposed bevel gears between which the pinion is disposed, a driven shaft mounted in the housing constantly driven by said drive shaft and on which the bevel gears are turnable, separate normally disengaged clutches between the shaft and bevel gears, means included with the clutch of one bevel gear and functioning automatically upon an increase in speed of the driven shaft above a predetermined normal to cause said clutch to be engaged and the one bevel gear to be rotated with the driven shaft while leaving the clutch of the other bevel gear disengaged, means included with the clutch of said other bevel gear and functioning automatically upon a decrease in speed of the driven shaft below said normal to cause the last named clutch to be engaged and the other bevel gear to be rotated with the driven shaft while leaving the first named clutch disengaged and a manually rotatable pinion meshing with the first named pinion independently of the bevel gears.

2. A propeller unit including a relatively fixed housing, a propeller hub turnably supported by the housing, propeller blades turnable in the hub to provide for pitch adjustment thereof, a drive shaft, drive connections between the shaft and hub to rotate the latter, a pitch control mechanism for the blades including a bevel pinion mounted in the housing radially out from the drive shaft and permanent drive connections between the pinion and blades; opposed bevel gears between which the pinion is disposed, a driven shaft mounted in the housing constantly driven by said drive shaft and on which the bevel gears are turnable, separate normally disengaged clutches between the shaft and bevel gears, means included with the clutch of one bevel gear and functioning automatically upon an increase in speed of the driven shaft above a predetermined normal to cause said clutch to be engaged and the one bevel gear to be rotated with the driven shaft while leaving the clutch of the other bevel gear disengaged, means included with the clutch of said other bevel gear and functioning automatically upon a decrease in speed of the driven shaft below said normal to cause the last named clutch to be engaged and the other bevel gear to be rotated with the driven shaft while leaving the first named clutch disengaged, and means between the element and the last named clutch to disconnect the latter from the driven shaft upon rotation of the element to an extent such that the propeller pitch has been decreased to a predetermined minimum.

3. A propeller unit including a relatively fixed housing, a propeller hub turnably supported by the housing, propeller blades turnable in the hub to provide for pitch adjustment thereof, a drive shaft, driving connections between the shaft and hub to rotate the latter, a pitch control mechanism for the blades including a bevel pinion mounted in the housing radially out from the drive shaft and permanent drive connections between the pinion and blades, a bevel gear engaging the pinion, a driven shaft mounted in the housing constantly driven in one direction by said drive shaft and on which the bevel gear is normally turnable and a normally disengaged clutch between the bevel gear and said driven shaft, the clutch including an annular band fixed with the gear, band engaging shoes disposed within the band, means mounting the shoes for rotation with the driven shaft as a unit and movable radially thereof and springs resisting outward radial movement of the shoes; the bevel gear engaging the pinion in such relation to the direction of rotation of the driven shaft as to effect a rotation of the pinion in a direction to produce pitch increasing movement of the blades.

4. A propeller unit including a relatively fixed housing, a propeller hub turnably supported by the housing, propeller blades turnable in the hub to provide for pitch adjustment thereof, a drive shaft, driving connections between the shaft and hub to rotate the latter, a pitch control mechanism for the blades including a bevel pinion mounted in the housing radially out from the drive shaft and permanent drive connections between the pinion and blades, a bevel gear engaging the pinion, a driven shaft mounted in the housing constantly driven in one direction by said drive shaft and on which the bevel gear is normally turnable and a normally disengaged clutch between the bevel gear and said driven shaft, the clutch including an annular band fixed with the bevel gear, a member on the driven shaft normally turning therewith, an arm pivoted on said member on an axis parallel to the driven shaft, a band engaging shoe on one end of the arm, a weight on the other end of the arm and a spring acting on the arm and tending to move the shoe radially out in opposition to outward movement of the weight by centrifugal force; the bevel gear engaging the pinion in such relation to the direction of rotation of the driven shaft as to effect a rotation of the pinion in a direction to produce a pitch decreasing movement of the blades.

5. A structure as in claim 4, with a normally engaged clutch between the driven shaft and the member thereon, and means functioning upon a pitch decreasing movement of the blades below a predetermined minimum to disengage said last named clutch.

6. A structure as in claim 4, with a normally engaged clutch between the driven shaft and the member thereon, and including a clutch member driven by and slidable on said driven shaft, a shifting fork for said member mounted in the housing, a rotary element mounted axially of the drive shaft and included with the pitch control mechanism, said element rotating in one direction upon a movement of the blades in a pitch decreasing direction, a cam on said element, and a member connected to the fork and engageable with the cam when the element has rotated a predetermined amount in said one direction to actuate the fork to disengage the clutch member.

PERCY RAY LEA.